United States Patent

Friedrich et al.

[11] Patent Number: 5,771,997
[45] Date of Patent: Jun. 30, 1998

[54] BRAKING SYSTEM IN CONJUNCTION WITH A HYDRODYNAMIC RETARDER, SPECIFICALLY FOR MOTOR VEHICLES

[75] Inventors: Jurgen Friedrich; Wolfgang Muller, both of Crailsheim, Germany

[73] Assignee: Voith Turbo GmbH, Heidenheim, Germany

[21] Appl. No.: 562,962

[22] Filed: Nov. 27, 1995

[30]  Foreign Application Priority Data

Nov. 26, 1994 [DE] Germany ............................ 44 42 219.9

[51] Int. Cl.⁶ ............................ B60T 10/02; B60T 1/087; F16D 57/04
[52] U.S. Cl. ............................................ 188/296; 477/183
[58] Field of Search ........................................ 188/293, 296, 188/140 A; 478/183, 184, 203–209

[56]  References Cited

U.S. PATENT DOCUMENTS

| | | | |
|---|---|---|---|
| 3,180,692 | 4/1965 | Muller | 188/296 |
| 3,547,231 | 12/1970 | Braun | 188/296 |
| 3,951,242 | 4/1976 | Fischer et al. | 188/296 |
| 3,958,671 | 5/1976 | Muller | 188/296 |
| 4,864,872 | 9/1989 | Stahl | 188/296 |

FOREIGN PATENT DOCUMENTS

| | | |
|---|---|---|
| 2927582 | 1/1981 | Germany . |
| 3028429 | 2/1982 | Germany . |
| 3940825 | 6/1991 | Germany . |
| 4408350 | 10/1994 | Germany . |

*Primary Examiner*—Matthew C. Graham
*Attorney, Agent, or Firm*—Baker & Daniels

[57] ABSTRACT

The invention relates to a braking system, specifically for a motor vehicle, with a hydrodynamic retarder featuring a stator impeller wheel and a rotor impeller wheel, a working medium sump, and a control device for controlling the degree of working space filling of the retarder. The control device includes a proportional valve as well as a connecting line to the sump, and the sump communicates with the working space of the retarder by way of a riser duct. A venting duct communicable with the sump whereby air pressure generated by the non-braking operation of the retarder can be vented from the sump to the atmosphere thereby providing a pressure balance of the forces acting on the level of the working medium sump.

9 Claims, 2 Drawing Sheets

BRAKING SYSTEM IN CONJUNCTION WITH A HYDRODYNAMIC RETARDER, SPECIFICALLY FOR MOTOR VEHICLES

BACKGROUND OF THE INVENTION

The invention relates to a braking system in conjunction with a hydrodynamic retarder, specifically for motor vehicles.

Such a braking system employs a single-circuit cooling system and comprises a hydrodynamic retarder including a stator impeller wheel and a rotor impeller wheel, a working medium sump and a control device for controlling the degree to which the working space of the retarder is filled. The control device includes a proportional valve and a connecting line to the sump, and the sump communicates with the working space of the retarder by way of a riser duct. Braking systems of this type have become known in a great many variants, refer for example to DE 44 08 350 A. Retarders are known also from a great number of publications, refer for example to DE 29 27 582, and there are prior control systems for controlling the working space fill level of the retarder, such as disclosed in DE 30 28 429, for example.

Presently customary braking systems include a control device comprised of a proportional valve and, additionally, a sump line between the proportional valve and the working medium sump. Additionally, the sump connects via a riser duct to the working space of the retarder. In braking operation, pressure is applied on the working medium level in the sump by means of the proportional valve via the sump line. In response, the working medium rises in the riser duct and proceeds into the working space, filling it to varying degrees with working medium. The proportional valve connects additionally to an air separator (oil side space), which rids the working medium—generally oil—of air inclusions in it and returns the oil to circulation, whereas the air is vented to the outside.

Consisting of oil, the operating medium serves additionally to lubricate the retarder bearings. Coordinated with the braking system is a heat exchanger serving to remove the considerable amount of heat which accrues during braking action.

A problem unsolved so far has emerged in the operation of braking systems of the described type at high speeds of rotation (>2000 min$^{-1}$): over time, more and more oil is lost from the overall braking system. Additionally, it is found that at such high RPM the bearing temperatures rise distinctly at no load. There are many possibilities for leakages—refer, e.g., to DE 30 28 429.

SUMMARY OF THE INVENTION

Of the many possibilities, it has been recognized that the real cause is as follows: it has been known for a long time that in nonbraking operation, i.e., with no oil in the working space of the retarder, the air trapped in it circulates, generating an undesirable power loss. All conceivable efforts were undertaken to preclude this undesirable air circulation—refer to, for example, DE 29 27 582. But what was not recognized, and what the present inventors discovered for the first time, is the fact that the air not only circulates in the working space, but also builds up a pressure, and that this pressure acts on the oil sump. This action occurs via the riser duct, which communicates with the bottom area of the sump. Thus, the pressure acts from below on the oil mass of the sump. As a result, oil is forced through the sump line, proceeds to the proportional valve and on into the air separator, the so-called oil side space. When oil amounts of appropriate magnitude accrue at this point, the air separator is no longer able to function fully, so that unacceptably large amounts of oil pass through the venting duct and escape into the open.

Consequently, the present invention provides means to achieve during braking operation a pressure balance of the forces acting on the level of the working medium sump. This prevents the undesirable air flow generated in braking to cause an escape of oil from the system.

BRIEF DESCRIPTION OF THE DRAWINGS

The invention, in one form thereof, is explained in detail with the aid of the drawings, wherein:

FIG. 1 illustrates diagrammatically and in partial sectional view a braking system in accordance with one form of the invention in an idling mode, while

DETAILED DESCRIPTION

Figure 1:
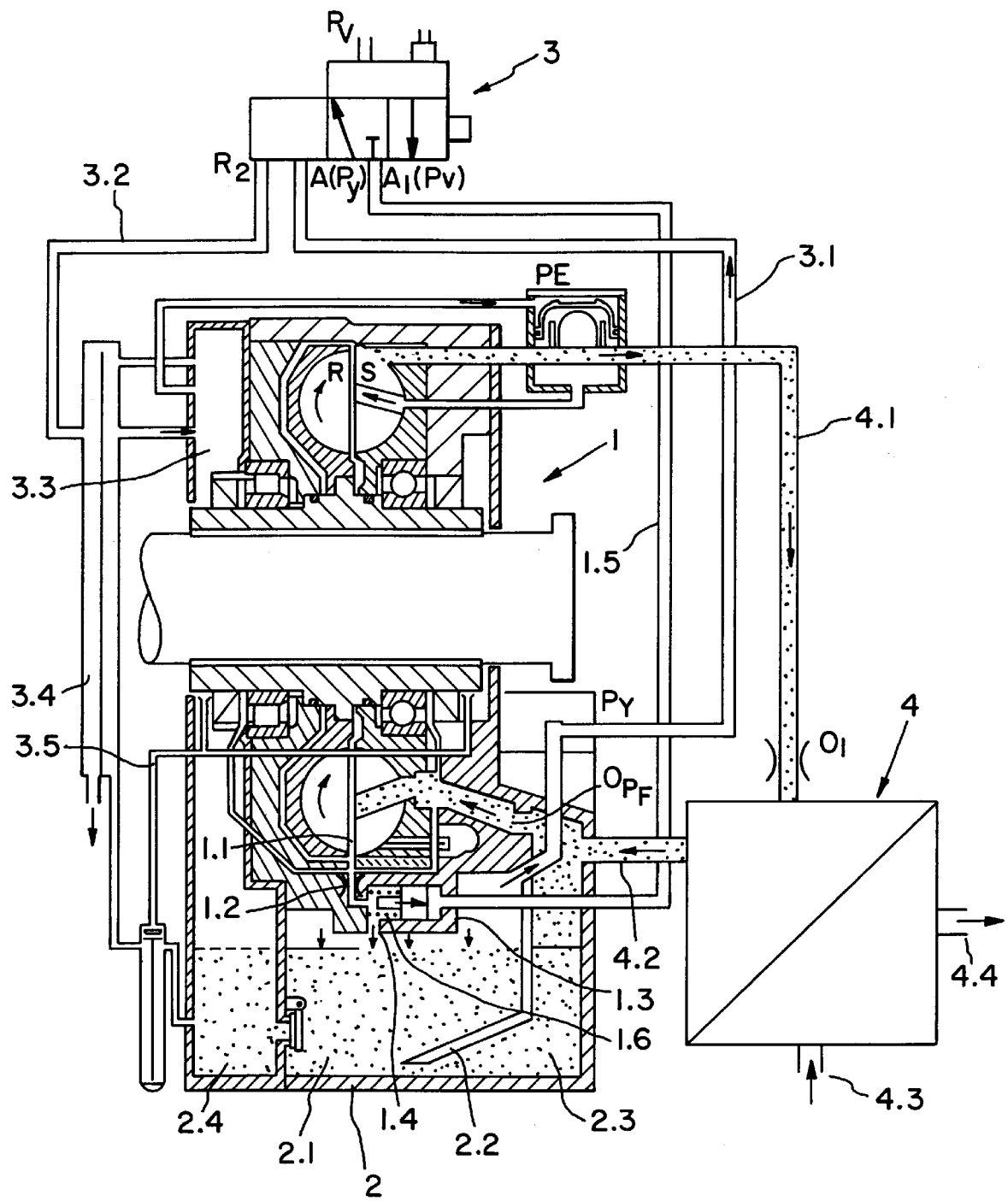

The retarder 1 includes a rotor R and a stator S, and the retarder housing 2 forms a main space 2.1 containing an oil sump and additionally a side space 2.4. A partition 2.2 separates main space 2.1 from a riser duct 2.3. As can be seen, riser duct 2.3 communicates with the working space of the retarder 1 by way of its stator S.

The braking system includes a control device, the control device including as a major part a proportional valve 3 with integrated 3/2-valve. A line 3.1 establishes a connection between main space 2.1 and proportional valve 3. A line 3.2 runs to an oil side space 3.3 serving as an oil separator and connecting to a venting duct 3.4 which communicates with a leakage oil return line of the bearings 3.5.

A heat exchanger 4 connects via a line 4.1 to the working space of the retarder 1 and via line 4.2 to the riser duct 2.3. Heat exchanger 4 has an inlet 4.3 and an outlet 4.4 for the cooling water.

The invention, in the form illustrated, comprises retarder 1 featuring between rotor R and stator S a gap 1.1. Between said gap 1.1 and the main space 2.1 of the sump, a conveying connection can be established or interrupted. Shown in the duct connected to the gap 1.1 is a choke 1.2, furthermore—as an extremely important element—a 2/2-valve 1.3. Valve 1.3 can be connected, via outlet 1.4, to the main space 2.1 and via a line 1.5 to the 3/2-way valve.

In the nonbraking operation, valve 1.3—hereafter referred to as the "gap shut-off valve"—remains open, and is kept open by a spring 1.6. Thus, no oil rises in sump line 3.1. The oil levels in main space 2.1, in side space 2.4 as well as in riser duct 2.3 are identical. The air flow generated in the working space of the retarder is vented via sump line 3.1.

A particularly favorable ancillary effect occurs because the working space of the retarder 1 sucks oil-air mixture through the riser duct 2.3. An oil-air mixture forms in the circulation and also in riser duct 2.3 itself. Attributable to centrifugal force, a certain amount of oil separates in the working space of retarder 1. This leads both to a reduction of the power loss and to a cooling effect.

Figure 2:
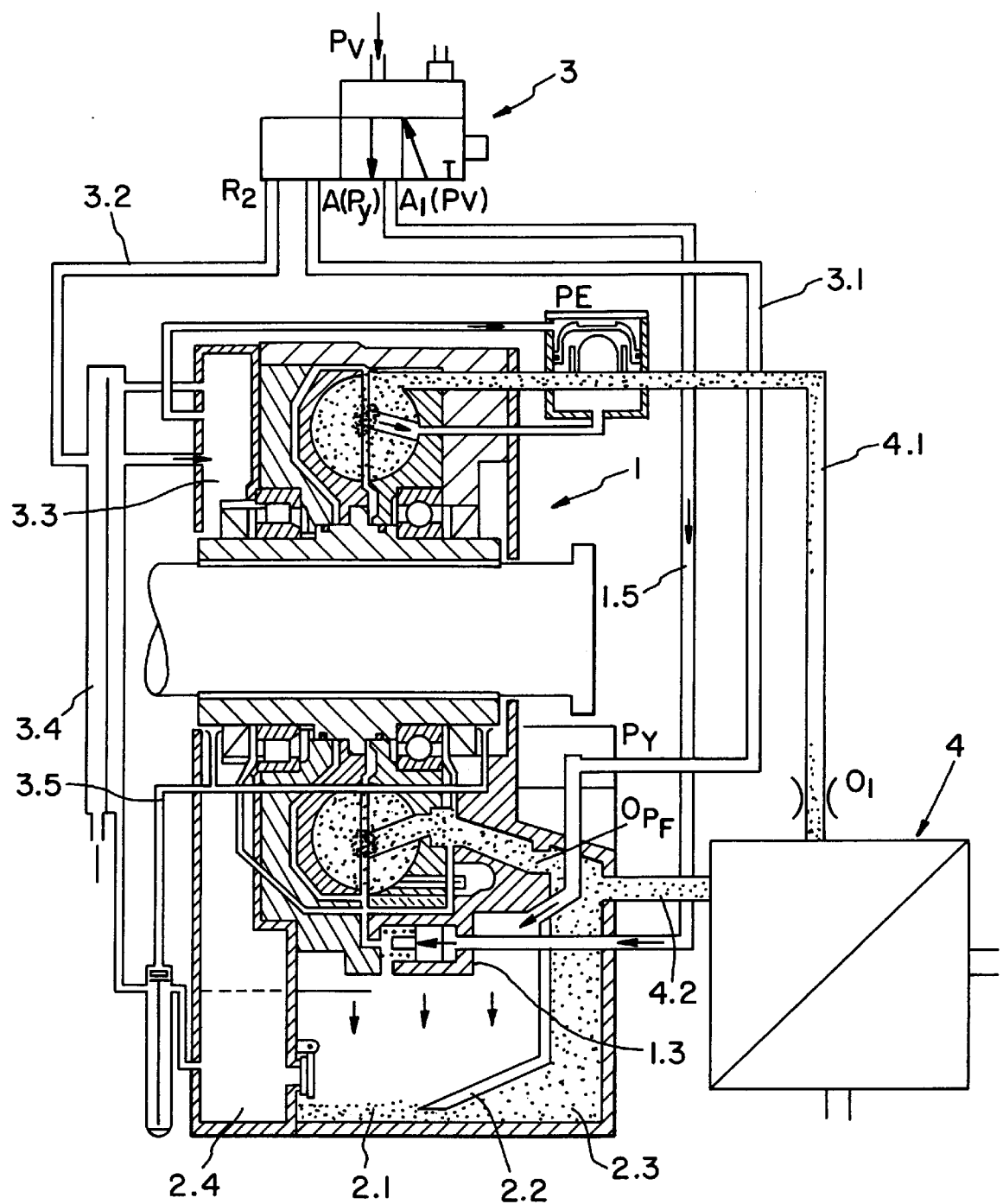
FIG. 2 shows the system in a braking mode.

As is evident from FIG. 2, which shows the system in braking mode, air pressure acts—beginning at proportional valve 3—via sump line 3.1 on the level of the sump in the main space 2.1. Oil from main space 2.1 is thereby forced into riser duct 2.3, where it flows around the bottom edge of partition 2.2. Oil rises in riser duct 2.3, proceeds through the wall of stator S of retarder 1 and fills the working space of the retarder.

Line 1.5 is pressurized as well through 3/2-way valve 3, causing the gap shut-off valve 1.3 to close. Hence, the open connection between the working space of retarder 1 and the main space 2.1 is blocked. Reference is made to the arrows indicating the direction of pressure or flow.

In detail, the following is accomplished by the invention:

in nonbraking operation, a depletion of the oil sump through the sump line is reliably avoided, thereby precluding unacceptable leakage;

the oil supply to the bearings remains assured;

forming in the riser line is an oil-air mixture that proceeds into the working space of the retarder, forms there an oil film on the inside walls of the working space, which leads to a reduction of the power loss and a cooling of the retarder. The generated heat from the power loss is removed by way of the heat exchanger.

What is claimed is:

1. A braking system for a motor vehicle, comprising:

a hydrodynamic retarder including a stator impeller wheel and a rotor impeller wheel, said retarder having a working space;

a working medium sump communicating with the working space of said retarder by means of a riser duct;

at least one main circuit fluid line providing fluid communication between said working space and said riser duct whereby working medium discharged from said retarder is conveyable through said at least one main circuit fluid line to said riser duct and said working space of said retarder;

a control device that controls the degree of retarder working space filling, said control device including a proportional valve and a sump line connected to said sump; and means for atmospherically venting air pressure from within said sump during non-braking operation of said retarder whereby pressures acting upon said working medium in said sump may be balanced.

2. The braking system of claim 1, wherein said retarder includes a gap, and including:

an open connection established between the retarder gap and a space above said sump, and a gap shut-off valve for selectively closing said open connection.

3. The braking system of claim 2, wherein said gap shut-off valve is connected to said proportional valve by a line.

4. The braking system of claim 3, including a choke disposed in said open connection between said retarder gap and said sump.

5. The braking system of claim 3, wherein said gap shut-off valve comprises a spring that maintains said shut-off valve open in non-braking operation.

6. The braking system of claim 2, including a choke disposed in said open connection between said retarder gap and said sump.

7. The braking system of claim 2, wherein said gap shut-off valve comprises a spring that maintains said shut-off valve open in non-braking operation.

8. The braking system of claim 1, wherein said proportional valve is a 3/2-way valve.

9. A braking system for a motor vehicle, said braking system comprising:

a hydrodynamic retarder including a stator impeller wheel and a rotor impeller wheel, said retarder having a working space;

a working medium sump;

a riser duct providing fluid communication between said working space and said sump;

at least one fluid line providing fluid communication between said working space and said riser duct whereby working medium discharged from said retarder is conveyable to said riser duct and said working space of said retarder;

an openable connection providing fluid communication between said retarder and said sump during non-braking operation of said retarder; and a venting duct communicable with said sump during non-braking operation of said retarder whereby air pressure communicated from said retarder by said openable connection to said sump may be atmospherically vented.

* * * * *